United States Patent
Stavaeus et al.

(10) Patent No.: US 8,116,975 B2
(45) Date of Patent: Feb. 14, 2012

(54) LANDMARK INFORMATION SYSTEM FOR AN AIRCRAFT

(75) Inventors: Mikael Stavaeus, Johanneshov (SE); Jan Peter, Gnoien (DE); Wolfgang Suess, Bremen (DE); Lars Rowold, Wiefelstede (DE)

(73) Assignee: Airbus Operations GmbH (DE)

( * ) Notice: Subject to any disclaimer, the term of this patent is extended or adjusted under 35 U.S.C. 154(b) by 528 days.

(21) Appl. No.: 11/704,888

(22) Filed: Feb. 9, 2007

(65) Prior Publication Data

US 2008/0021636 A1 Jan. 24, 2008

Related U.S. Application Data

(60) Provisional application No. 60/774,155, filed on Feb. 16, 2006.

(30) Foreign Application Priority Data

Feb. 16, 2006 (DE) .................... 10 2006 007 283

(51) Int. Cl.
G01C 21/00 (2006.01)
(52) U.S. Cl. ..... 701/207; 345/633; 348/144; 244/129.3; 340/979
(58) Field of Classification Search ................ 701/3, 18, 701/207, 208, 211; 340/971, 980, 995.1, 340/995.14–995.18, 995.24, 979; 345/7–9, 345/76, 633; 348/148, 144, 169; 725/76; 313/506; 244/129.3; G01C 21/00
See application file for complete search history.

(56) References Cited

U.S. PATENT DOCUMENTS

| | | | | |
|---|---|---|---|---|
| 5,566,073 A | * | 10/1996 | Margolin | 701/213 |
| 5,815,411 A | * | 9/1998 | Ellenby et al. | 702/150 |
| 6,101,431 A | * | 8/2000 | Niwa et al. | 701/14 |
| 6,208,933 B1 | * | 3/2001 | Lazar | 701/207 |
| 6,598,227 B1 | * | 7/2003 | Berry et al. | 725/77 |
| 6,612,840 B1 | * | 9/2003 | Turner | 434/38 |
| 6,896,375 B2 | * | 5/2005 | Peterson et al. | 353/66 |
| 7,002,551 B2 | * | 2/2006 | Azuma et al. | 345/158 |
| 7,336,271 B2 | * | 2/2008 | Ozeki et al. | 345/204 |
| 7,341,353 B2 | * | 3/2008 | Peterson et al. | 353/52 |
| 7,350,753 B2 | * | 4/2008 | Guidon et al. | 244/129.3 |
| 7,450,294 B2 | * | 11/2008 | Weidner | 359/275 |
| 7,456,847 B2 | * | 11/2008 | Krajec | 345/629 |
| 7,479,967 B2 | * | 1/2009 | Bachelder et al. | 345/592 |
| 7,600,248 B1 | * | 10/2009 | Berry | 725/77 |
| 2002/0145081 A1 | * | 10/2002 | Lau et al. | 244/129.3 |
| 2003/0112132 A1 | * | 6/2003 | Trajkovic et al. | 340/435 |
| 2003/0209893 A1 | * | 11/2003 | Breed et al. | 280/735 |

(Continued)

FOREIGN PATENT DOCUMENTS

DE 197 08 610 9/1998
(Continued)

*Primary Examiner* — Tuan C. To
(74) *Attorney, Agent, or Firm* — Lerner, David, Littenberg, Krumholz & Mentlik, LLP

(57) ABSTRACT

A landmark information system in an aircraft, by which landmark information system data relating to informing, instructing and entertaining passengers may be visually presented. An aircraft equipped with a landmark information system is also provided. The landmark information system comprises an aircraft window with at least one pane and a control unit. The at least one pane is coated with a translucent display that is coupled to the control unit, which, for the purpose of presenting information, is equipped to supply electrical current in a targeted manner to the display. Furthermore, the landmark information system comprises a landmark determination device which may provide geographic data relating to landmarks, for presentation on the translucent display.

14 Claims, 2 Drawing Sheets

U.S. PATENT DOCUMENTS

| | | | |
|---|---|---|---|
| 2004/0130442 A1* | 7/2004 | Breed et al. | 340/443 |
| 2005/0046341 A1* | 3/2005 | Ikeda et al. | 313/504 |
| 2005/0232469 A1* | 10/2005 | Schofield et al. | 382/104 |
| 2005/0259301 A1* | 11/2005 | Aoki et al. | 359/13 |
| 2005/0278753 A1* | 12/2005 | Brady et al. | 725/76 |

FOREIGN PATENT DOCUMENTS

| | | |
|---|---|---|
| DE | 697 23 483 | 6/2004 |
| EP | 0 911 647 | 4/1999 |
| EP | 1 065 519 | 1/2001 |
| JP | 05058287 A * | 3/1993 |

* cited by examiner

RGB coulour pixels

LANDMARK INFORMATION SYSTEM FOR AN AIRCRAFT

CROSS-REFERENCE TO RELATED APPLICATIONS

This application claims the benefit of the filing date of U.S. Provisional Patent Application No. 60/774,155 filed Feb. 16, 2006, the disclosure of which is hereby incorporated herein by reference.

BACKGROUND OF THE INVENTION

The present invention generally relates to the technical field of equipment installation in an aircraft. In particular, the invention relates to a landmark information system for an aircraft, by which landmark information system data relating to informing, instructing and entertaining passengers may be visually presented. Furthermore, the invention relates to an aircraft equipped with a landmark information system according to the invention, to a method for visually presenting geographic data, to a computer-readable medium, and to a program element.

In older types of large-capacity passenger aircraft, in particular in economy class, it is common for only a few monitors or flat-panel monitors to be arranged, distributed in the cabin, for entertaining, instructing and informing passengers. However, these monitors are often arranged such that only few passengers have an unrestricted view of the monitors.

Furthermore, in particular in newer types of large-capacity passenger aircraft, in particular in first class and in business class, it is common for the backrests of the passenger seats to comprise small flat-panel monitors, on which the person seated behind may call up information or view entertainment programs. However, these monitors are associated with considerable weight, which is of course always undesirable in the field of aircraft and space technology.

While on these known display systems frequently information relating to current flight data is provided, often in the presentation of information on the central displays there is, however, no reference to the current position of the aircraft and of the flight route.

Based on the disadvantages associated with known information- and entertainment systems, as described above, there may be a need to graphically present information to passengers so that it comes alive.

SUMMARY OF THE INVENTION

According to an exemplary embodiment of the invention there is provided a landmark information system that is specially designed for use in an aircraft. According to an exemplary embodiment of the invention the landmark information system comprises a landmark determination device and an aircraft window with at least one windowpane and a translucent display by which the windowpane is coated. Apart from this the landmark information system comprises a control unit that is designed to process the data intended for visual presentation in order to provide such data in processed form to the display. This translucent display is coupled to the above-mentioned control unit, which is correspondingly designed to supply electrical current in a targeted manner to the translucent display, for the purpose of presenting the above-mentioned information.

The information to be presented, which involves geographical data relating to landmarks, may be provided for the control unit by the landmark determination device. In this arrangement the geographical data of those landmarks that are within the field of view of a viewer may be displayed. Through the aircraft window the field of view of a viewer looking at the landscape from the aircraft window may be limited. The landmarks that a viewer currently sees when looking through the aircraft window may therefore limit the quantity of information to be presented.

According to an exemplary embodiment of the invention there is provided an aircraft comprising the landmark information system according to the invention.

According to an exemplary embodiment of the invention there is provided a method for the visual presentation of geographic data, which method first determines the current flight data. By this flight data the current flight path may be entered on a digitalised geographic map. The flight data may for example be position data of the aircraft, which position data is determined by a global positioning system (GPS), or is read out from the flight management system (FMS).

The position of the aircraft may, for example, be compared with information contained in a (3-D) terrain database. In this way it is possible to determine which landmarks are in (direct) proximity or which landmarks are of particular interest so as to be presented on a display.

By the position data or the information relating to the surroundings, landmarks situated in close proximity to the aircraft may be detected or identified. For example, this may be realised with a video camera and with methods of digital image detection or identification for objects within visual range. By a radar system, an object situated further away may be detected. Likewise, the flight position, determined by way of the flight data, may be localized on a digitalised map. In this way landmarks that are in close proximity or that are situated in the direction of view may be determined.

Once the landmarks have been detected or identified, geographical data associated with these landmarks may be determined, which geographical data may be of interest to a passenger. Such geographical data is provided.

Examples of geographical data of interest to a passenger include names of landmarks, i.e. names of cities, countries, mountain ranges, individual mountains, volcanoes, lakes, rivers, seas, deserts or nature reserves. To this effect information such as the respective height, length or depth, or historical data, may be presented. Furthermore, landmarks may involve objects of interest, places of cultural significance, monuments or historic buildings. In this context the question as to whether the object is a special landmark is of interest. In relation to special landmarks, too, there is a host of information that may be of interest to a passenger. Also of interest might be the points of the compass, the position of the North Pole and South Pole, the path of the sun or the orbit of planets. Furthermore, invisible or remote objects may be of interest in that their relative position is shown in relation to a flight position, or in that their distance from a flight position is shown. In relation to the individual landmarks, data that is to be overlaid in addition, e.g. information relating to cities or buildings, may be provided.

To prevent having to view and process all the available landmarks, the number of landmarks of interest within the field of view of a passenger may be limited. In this arrangement the field of view of a passenger may be limited by an opening such as a window. For example, for a passenger looking out of a window in the direction of North, the landmarks situated in northerly direction may be of interest. The landmarks in the opposite direction may then be disregarded.

In relation to the landmarks found, the desired information is displayed. In this arrangement the information to be displayed may be filtered. Superficial information may be blocked by the filter and is not displayed. A passenger may define in advance which information is to be displayed.

According to an exemplary embodiment of the invention there is provided a computer-readable medium, on which a program for visually presenting geographic data is stored, which program, when executed by a processor, is designed to implement the method described above.

According to an exemplary embodiment of the invention there is provided a program element for visually presenting geographic data, which program, when executed by a processor, is adapted to implement the method described above.

Since, as a rule, an aircraft window is associated with each seat row in a large-capacity passenger aircraft, the landmark information system may be viewed almost equally well from any seat. However, since it is of course not desirable that, because the display of the landmark information system is arranged on the windowpanes, the view to the outside is restricted, the display is designed so as to be translucent so that at least a partially unimpeded view to the outside continues to be possible even while information is presented on the display.

Such a translucent display may, for example, be made from a multitude of light emitting diodes. In particular the translucent display of the landmark information system may comprise a multitude of organic light emitting diodes (OLEDs), which may, for example, be applied directly to at least one pane in the form of a coating.

As an alternative to the above, the organic light emitting diodes may also be applied to a transparent substrate as a carrier material, for example a polymer film, glass or quartz, which carrier material is then used to coat the pane, or which carrier material is glued onto or laminated onto the pane of the aircraft window.

In the case of organic light emitting diodes (hereinafter referred to as OLEDs), these may be light emitting diodes made of organic semiconducting polymers or small molecules that may be produced far more economically than inorganic LEDs. By arranging a multitude of small OLEDs it is, for example, possible to create a graphic display as proposed for use in the context of the present invention. As an alternative, the OLEDs applied to the pane of the aircraft window may also be used for illumination purposes, for example in order to create particular illumination scenarios. Since a display constructed in this way with the use of OLEDs, in contrast to conventional liquid-crystal display monitors, does not need background illumination, the display may be designed so as to be translucent, which in the context of the present invention is necessary so as not to impede the unrestricted view through the aircraft window. Apart from this, the fact that no background illumination is needed has a positive effect on the weight of the display so that considerable weight may be saved when compared to conventional liquid-crystal display monitors.

A display produced with the use of OLEDs further features a large angle of view region of up to 170° and a fast circuit speed, so that a display produced in this way is well suitable to reproduce moving images. Furthermore, if they are made as coated films, OLED displays are thin and flexible so that they may also be used on curved (window) surfaces.

According to an exemplary embodiment of the invention the landmark determination device comprises a flight data determination device, wherein the flight data determination device is designed to determine the position of the aircraft.

Flight data may be communicated to the flight data determination device by way of the instruments of the aircraft. Since the position and situation of landmarks is to be determined it may be advantageous if information about the flight route at the time is known. It is thus possible to determine the position of the aircraft or of some other means of locomotion on land or sea.

In this context, helpful information might include the geographic position and altitude of the aircraft. Furthermore, cruising speed and the current direction may be used to determine a location. The geographic position and flight altitude may be determined with the use of a GPS system. By geographic data it may be possible to determine the current location of the aircraft and to enter this location on a map. In this way an assessment may be made as to which landmarks are of interest.

Various prominent features in the landscape may be landmarks. For example, mountain ranges, buildings, rivers or cities may be designated as landmarks.

Since a passenger would frequently like to obtain information about the landmarks that are near said passenger, by determining the current position of the aircraft, and in particular with reference to a selected flight route, the number of the landmarks relevant for presentation purposes may be limited. These relevant landmarks may be near the flight route. In other words this means that only such landmarks may be of interest that are within a particular radius of the current position.

The flight data determination device may determine the real flight data and may convert it into a form that may be digitally evaluated. In this way the data may be electronically reprocessed.

Apart from being determined on the basis of the geographic position and apart from being looked up on a map, landmarks may also be detected or identified with the use of a radar system or a video camera. One prerequisite for detecting or identifying a landmark may involve prior knowledge of characteristics of the landmark or of the position of the landmark. In this case a landmark may be identified, or its detection may be verified, as soon as it has been acquired or detected by an acquisition system.

According to an exemplary embodiment of the invention, the landmark determination device comprises a data storage device for holding and providing geographic data.

A data storage device may be a database or an information network by which the landmark information system may access geographic data of the respective landmark. Once a landmark has been detected or identified, previously entered additional information relating to the landmark may be called up from the data storage device. Apart from the name of the landmark, for example the year of construction of a building, or the extension of a mountain range might be of interest. Further additional information that may interest a passenger depends on the interests of said passenger. Moreover, the information provided may depend on the strategy of the respective aircraft operator or airline.

For example, it may be possible to visually present airports that form part of the network of a particular aircraft operator or airline. An aircraft operator may also wish to set itself apart in that it would like to provide its passengers with as much historical information as possible on the route traveled.

According to an exemplary embodiment of the invention, the landmark determination device comprises a location determination device. The location determination device is used to show the flight position on a geographic map. In this arrangement, the geographic map may show landmarks. On the map, a determination may be made as to which landmarks are of interest. In particular, it may be determined which landmarks are situated in a particular angle of view of a passenger or viewer.

The location determination device may be coupled to the flight data determination device and to the data storage device; quasi as an information hub said location determination device makes it possible to exchange data between the flight data and the stored geographic data. This may be augmented by the positions of the landmarks on a map, or by detection of the landmarks by a radar system or a video camera.

According to an exemplary embodiment of the invention, the landmark determination device comprises a field of view determination device that is coupled to the location determination device.

In the location determination device a multitude of landmarks may have been determined that are located within a circumscribed circle of the geographic position of the aircraft. However, the view which a passenger has from an aircraft window is limited by the corresponding window section. Since as a rule the windows in an aircraft are arranged at a right angle in relation to the flight route of the aircraft, the field of view of a passenger looking out of the window may be restricted. Consequently, landmarks that are, for example, situated away from the direction of view of the passenger may be ignored. This may allow a reduction in the landmark information to be determined. The number of landmarks located within a circumscribed circle of the position of the aircraft may be limited to those landmarks that are located in a section of the circumscribed circle.

However, it may also be desirable to carry out an individual field of view determination and landmark determination for each window, because the windows in aircraft are arranged in a row. Due to the different arrangement of several displays, each display has a field of view of its own. It may also happen that an aircraft, for example a blended wing/body aircraft, does not comprise any windows but only displays. As a result of the different arrangement or position the fields of view of the individual windows or of the individual displays may differ. Consequently, individual calculation or visual presentation of geographic data may be required.

According to an exemplary embodiment of the invention, the landmark determination device comprises a filter device that carries out a selection of the information to be displayed. The information to be displayed may be specified. The filter device is connected to the field of view determination device such that it receives information to be shown from the field of view determination device.

By the filter device particular information may be selected from information that may be stored in relation to a landmark. To this effect, for example, categories in relation to the information may be determined. For example historical data, geological information, or distances may be different categories of geographic data. A passenger may then determine that s/he only wishes to have a particular category of information displayed. In this way passengers themselves may determine the contents of the information shown.

When all the additional information has been determined, displaying it may take place directly on the aircraft window. In this way a relationship between the additional geographic data and the field of view of the passenger, which field of view is currently present at the time the passenger looks out of the window, may be established. In this way the passenger may quickly access the desired information in a manner that is close to reality. To this effect the information determined by the landmark determination device may be displayed on the aircraft window by way of a translucent display.

In concrete terms, according to an exemplary embodiment of the invention, the landmark information system may be considered as an application of a system "Information and Entertainment in Aircraft Windows", which may be used to visually display landmarks such as cities, mountain ranges, objects of interest, rivers and lakes on a windowpane of an aircraft.

In concrete terms, the notion of augmented reality "AR" relates to the ability of supplying geometric and geographic information in this way to a passenger, depending on the position of the aircraft on the globe. The term "AR" refers to the field of view of a passenger, the so-called reality, in addition being visually augmented with additional data. The additional data may be provided or generated by a computer.

Thus, when looking out of a window, in parallel, a passenger may be provided with information on the window about existing landmarks. By way of an example during a flight above Europe, for the benefit of the passenger, information stating that the aircraft is travelling at a certain distance from a city, for example Rome, and at another distance from some other city, for example Berlin, is superimposed on the window.

The navigation application may operate with GPS data, digitalised geographic maps or landmarks and various algorithms.

The term augmented reality relates to a method for an application in order to expand the visual environment of the passenger. In this process, an image that is really seen by a person is augmented by graphic elements. To this effect the field of view of a passenger is filmed or determined, and subsequently information or graphic elements are superimposed on a display, which information or graphic elements seamlessly integrate in the image viewed. In this way whatever a viewer sees is augmented with data. In conjunction with transparent displays, AR may be used to expand, with data and graphics relating to selected landmarks, the surroundings that a passenger sees through the aircraft window.

The present invention may be used to visually present geographic data that is incorporated in the real field of view of the passenger. A landmark information system may be an add-on to the onboard entertainment system. In this way a new information channel may be opened up, and an airline may well gain a competitive advantage and a certain individuality.

The position of the aircraft relative to the globe may be calculated, data to be superimposed may be prioritised, and data to be superimposed may be calculated depending on the window position in the aircraft.

A landmark information system may be regarded as a new and fascinating entertainment add-on, and may help an airline gain a competitive advantage and more individuality. In combination with conventional seat monitors and ceiling monitors, parallel operation of various emissions such as flight information and cinema may take place. Energy savings may be achieved when compared to conventional seat monitors and ceiling monitors. Moreover, OLED displays may be used, which feature lower power consumption than is the case with LCD displays.

According to an exemplary embodiment of the invention, the landmark information system comprises a server computer or central computer that is equipped with a storage unit in which a multitude of different applications or entertainment media may be stored, which may be presented or played on the display of the landmark information system. To this effect, by accessing the applications stored in the storage unit, the server computer provides image data to the control unit, which in turn converts this image data to corresponding control signals.

In order to convert the image data to control signals, the control unit may, for example, comprise at least one display controller with a microprocessor, which recalculates or converts the image data that has been provided by the server computer to form a matrix model that is used as a basis for supplying electrical current to the display. In this arrangement each display controller has an ID of its own so as to be able to be identified and addressed by the server computer so that the display controllers may by fed with (image-) data by the server computer. In this arrangement, recalculating or converting the image data to form a matrix model takes place by the microprocessor, because the individual organic diodes of the display are arranged in a corresponding manner in a line-column matrix so that a specific line number or column number may be allocated to each individual diode, which diode emits a coloured light when a voltage is applied.

Since it is not always desirable to display the same information or the same entertainment program on each display, a particular group of aircraft windows may have a display controller of their own allocated to them. In this case, apart from its functionality to control the display, the display controller may also have a further functionality that makes it possible to address the server computer in order to select a particular application by the display controller, which application is to be displayed on a group of aircraft windows or on the displays fitted to said aircraft windows.

Since, in particular in the presentation of entertainment programs such as feature films or animation for entertainment purposes, moving images have to be visually presented, each display controller is coupled to the server computer by way of a data bus that is equipped to implement or ensure real-time data transmission. Such a data bus may, for example, be a network system, for example the Airbus CIDS cabin management system, which may be installed as a central control unit in an aircraft. To provide multimedia contents, the system may be designed as a streaming solution. Normally this cabin management system controls important cabin functions and handles the display of status information for passengers and the crew, and may thus without major modifications be used to transmit image data.

For the purpose of inputting information the OLED display may comprise a touch screen functionality. In this way a user may make a selection of objects by touching the display.

The server computer required for the landmark information system may be implemented as part of an existing computer in the aircraft, or as a separate computer (high-performance hardware). In this arrangement the central computer may be integrated into or connected to the network of the aircraft, such as for example the CIDS, in order to make it possible to use flight data in various applications. The display controller may be designed as a streaming client in order to process the information provided by the server.

With the landmark information system according to the invention various types of information may be presented, such as, for example, flight data and travel data, entertainment information, geographic information or illumination scenarios in the passenger cabin. For example, by accessing a GPS application, information relating to the distance and direction of geographic situations may be presented on the window displays so that flight passengers are always graphically informed about their current position. Generally speaking, the range of possible applications that may be presented on the displays is vast, so that below only some options are mentioned by way of examples.

For example, the following may be shown on the displays: advertising information relating to an aircraft operator or airline; general flight information such as flight altitude, speed and distance; seat numbers; safety information; information relating to emergency exits; animated entertainment such as feature films or children's films; information relating to onward flight connections, depending on the particular passenger seated beside the landmark information system concerned; or various illumination scenarios. Furthermore, the landmark information system may be used to reduce the incoming light in that the individual organic light emitting diodes are made to produce a dark colour.

BRIEF DESCRIPTION OF THE DRAWINGS

Below, the present invention is explained by way of an example with reference to the enclosed drawings. It should be emphasised that the embodiments of the invention as shown in the figures explain the invention merely by way of an example and should in particular not be interpreted in any way as limiting the scope of protection. The following are shown.

DETAILED DESCRIPTION

Figure 1:
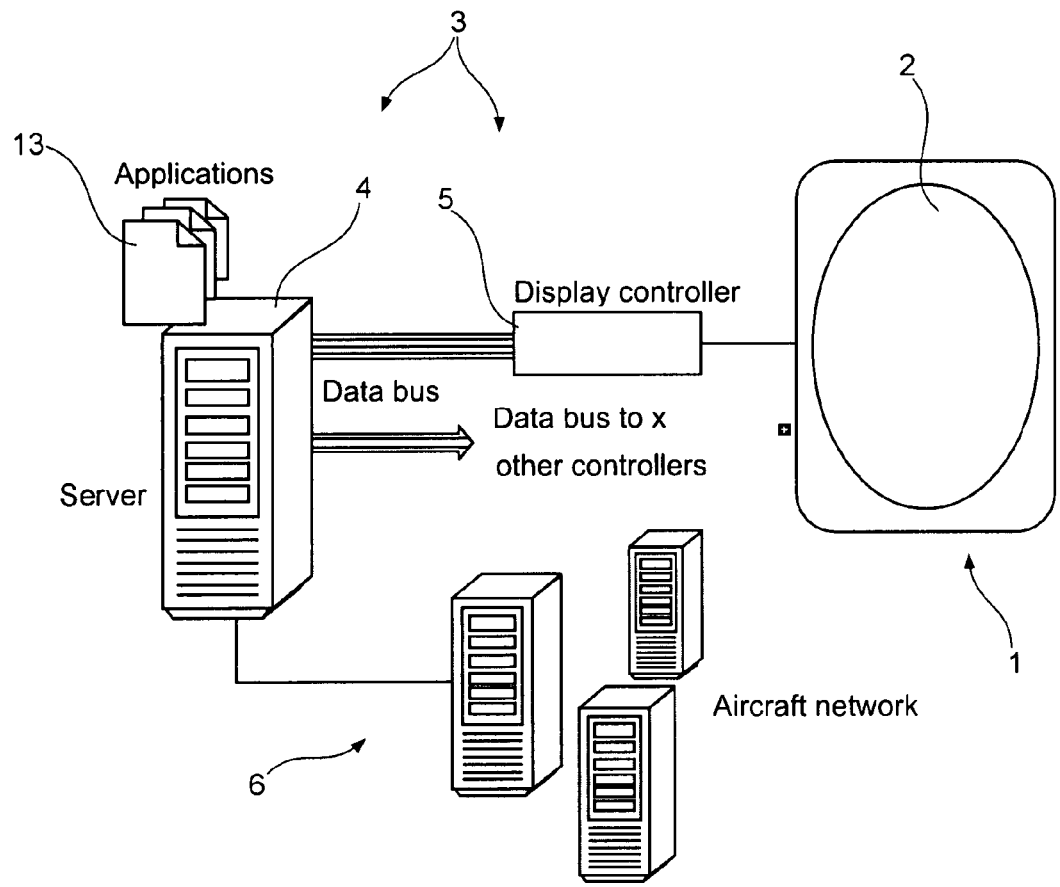
FIG. 1 a system overview of the landmark information system according to the invention.

FIG. 1 shows a system overview of the landmark information system according to the invention. As shown in FIG. 1, the landmark information system according to the invention comprises at least one aircraft window 1 to which at least one windowpane 2 has been fitted. Furthermore, the landmark information system also comprises a control unit 3, which may, for example, comprise a server computer 4 with a multitude of display controllers 5. In order to visually display certain information or entertainment media on the windowpane, the pane 2 of the aircraft window 1 is coated with a translucent display. This coating may, for example, be implemented by direct coating of the pane 2 with a multitude of organic light emitting diodes. As an alternative, the coating may be implemented by a film on which OLEDS are arranged in columns and rows.

As further shown in FIG. 1, the translucent display of the aircraft window 1 is coupled to the control unit 3 in order to be caused, by the control unit, to display the desired information, which may, for example, be stored in a storage unit on the server computer. In order to be able to present the image information, which is stored on the server computer, by the aircraft window that has been coated with OLEDs, a display controller is connected between the display of the aircraft window 1 and the server computer 4, which display controller recalculates the image data provided by the server computer 4 to create a matrix model, so that, depending on this matrix data, electrical current may be applied to the OLEDs that are arranged on the windowpane 2 in columns and rows.

As shown in FIG. 1, several display controllers 5 may be connected to the server computer 4 in order to be able to separately control the displays of individual aircraft windows 1, and in order to be able to provide said displays with various image data. In this arrangement the individual display controllers may be arranged directly near the aircraft windows 1, for example on the rear of the window lining or on the rear of the cabin lining. In this way various types of information data or entertainment data may be presented on the displays of different aircraft windows 1.

In this arrangement the individual display controllers 5 are thus coupled to the server computer 4 by way of a data bus, which is able to ensure real-time data transmission so that presentation of moving images is possible without any jerking or delay.

As shown in FIG. 1, the server computer 4 is incorporated in the network system 6 of the aircraft, which network system 6 may, for example, be the Airbus CIDS cabin management system, which is installed as a central control unit in Airbus aircraft.

Figure 2:
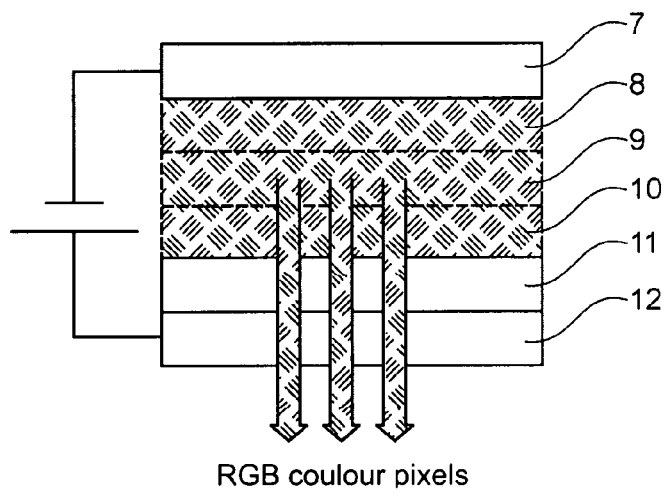
FIG. 2 the basic design of an OLED light emitting diode.

Finally, with reference to FIG. 2, the function of a display coated with OLEDs is described. For example an organic dye provides the key to the function of OLEDs. This dye has various states of excitation. If an electron coincides with a hole in the dye, an excited state exists, from which a photon (light particle) may be emitted. The dye may also be excited by light, which may, for example, result in fluorescence.

The excited states are generated in a thin film 8 of the dye. Electrical current flows through this film 8 in the following manner: excited electrons on one side are fed to holes in the other side of the anode 11 by way of a metal cathode 7. The electrons and holes move into the dye 8, meet, and form excited states. In this process, typically, a current of approximately 5 to 10 volt is present between the metallic cathode 7 and the transparent anode. When the electrons "fall" into the holes (recombination), the desired light is emitted by the transparent substrate 12, which may, for example, be the windowpane 2 of the aircraft window. The colour of this light depends on the energy released during this process.

Figure 3:
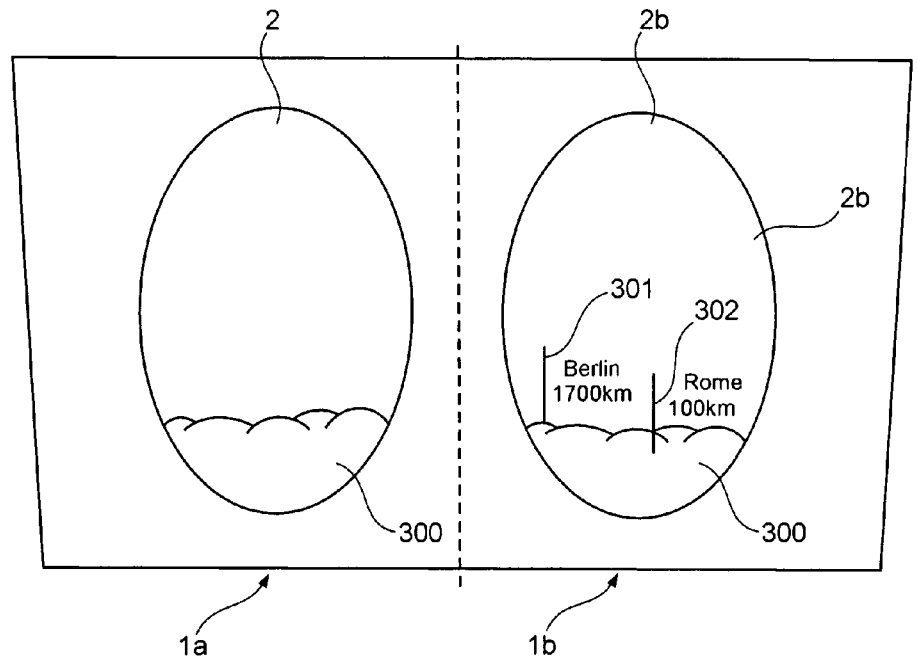
FIG. 3 an aircraft window of a row of windows without superimposed additional information, and an aircraft window of a row of windows with superimposed additional information.

FIG. 3 shows an aircraft window without superimposed additional information (left-hand side), and with superimposed additional information (right-hand side). The diagram shows two aircraft windows 1a, 1b, arranged side by side. The windowpanes 2a and 2b determine the field of view of a person looking out of the window 1a, 1b. The person looking out of the window may be a passenger in the aircraft.

Landmarks may fall within the field of view of the person looking out of the window, which landmarks may be detected or identified by the system and for which landmarks additional information is to be displayed. However, in the case illustrated in FIG. 3, no landmarks may be detected or identified because clouds 300 block the view.

Nevertheless, it may be of interest to a passenger to have various types of information displayed. For example, it may be of interest to receive the location of capital cities in relation to the current flight route at the time. In this way a passenger may, for example, estimate the flight time.

A passenger may decide to switch his/her landmark information system on. The passenger may select the desired information to be displayed; the information is then displayed on the window. In FIG. 3 the information relates to the distance to/from, and to the position of, the cities Rome 302 and Berlin 301.

When the desired information has been displayed, the OLED display 2a, 2b may be switched off so that the view through the window and onto the landmark is not overlaid by additional information. This switched-off state is shown in the window 1a.

Figure 4:
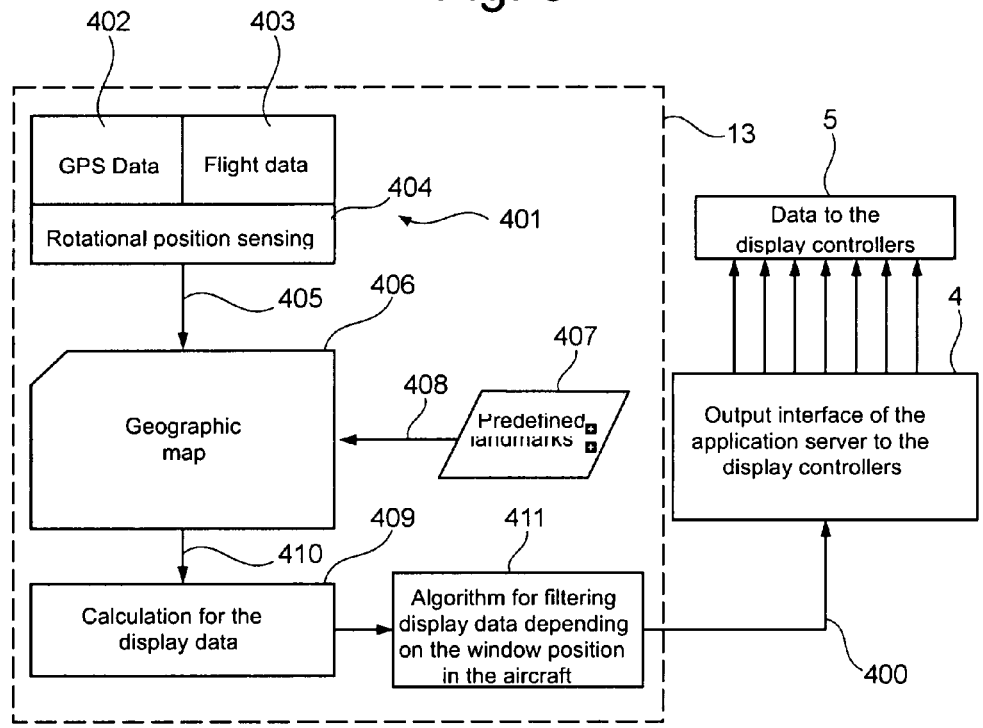
FIG. 4 a system overview of the landmark determination device.

FIG. 4 shows a system overview of the landmark determination device. The landmark determination device 13 determines additional information relating to landmarks, and by way of the connection 400 transmits this information to be displayed to a server computer 4 and a display controller 5 so as to display the information on the windowpanes 2a, 2b.

As shown in FIG. 1, the landmark determination device is a device which provides to the server 4 and to the display controller 5 information to be displayed.

The landmark determination device 13 comprises the flight data determination device 401. The flight data determination device 401 in turn comprises a GPS device 402, the flight data device 403, and the rotational position sensing device 404.

The flight data device 403 in turn comprises the course determination device and the speed determination device (neither of which is shown in FIG. 4). By the information that may be obtained in the flight data determination device 401 and that may be transmitted to the location determination device 406 by way of the connection 405, the position of the aircraft on the globe may be determined. Furthermore, all the information required to determine altitudes, directions and time differences is present.

Due to the known position and the available map material, the landmark of interest may be determined in the location determination device 406. Any landscape feature situated on a circumscribed circle of the aircraft position is a possible landmark. Additional information relating to a landmark may be provided by way of the data storage device 407. Prior to departure of the aircraft, landmarks that have been determined to be of significance may have been stored, together with additional information, in the data storage device 407, and may be called up by the location determination device 406 by way of the connection 408.

When the additional information and the landmarks of interest have been identified, a selection of the relevant landmarks may take place in the field of view determination device 409. To this effect, the relevant information, which depends on the current view position of the passenger, is determined. In this determination, data is accessed that is provided by way of the connection 410.

In the filter device, the information desired by a passenger is evaluated and provided. In this way it is possible to display information that has been individually compiled for a specific passenger. Apart from distances, as shown in FIG. 3, also historical data relating to cities, or names of mountain ranges might be of interest. For this purpose, a user may interactively control the landmark information system, and in particular the landmark determination device 13. For example, the window 2a, 2b may also be used as an input device, to which effect the window is designed as a touch screen.

The views calculated by the filter device 411 are provided to the display computer 4 by way of the connection 400, which display computer 4, together with the display controller, processes superimposing the information onto the windowpanes 2a, 2b.

In addition, it should be pointed out that "comprising" does not exclude other elements or steps, and "a" or "one" does not exclude a plural number. Furthermore, it should be pointed out that features or steps which have been described with reference to one of the above exemplary embodiments may also be used in combination with other features or steps of other exemplary embodiments described above. Reference characters in the claims are not to be interpreted as limitations.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A landmark information system in an aircraft, comprising:
   a landmark determination device;
   a plurality of aircraft windows each with at least one pane; and a control unit;
wherein the at least one pane of each of the plurality of aircraft windows is coated with a translucent display that is coupled to the control unit which, for the purpose of presenting information, is equipped to supply electrical current in a targeted manner to the display such that at least a partially unimpeded view to the outside continues to be possible through the translucent display even while the information is presented on the display;
wherein the landmark determination device is equipped to provide to the control unit the information that is to be displayed;
wherein the information that is to be displayed involves geographic data relating to landmarks; and
wherein the landmarks form part of a field of view of a viewer looking at the landscape through at least one of the plurality of aircraft windows;
wherein the landmark determination device further comprises a field of view determination device to determine landmarks that may be seen through each of the plurality of aircraft windows for an individual visual presentation of the geographic data; and
wherein a particular group of the plurality of aircraft windows is allocated to an individual display controller.

2. The landmark information system of claim 1,
wherein the landmark determination device comprises a flight data determination device; and
wherein the flight data determination device is designed to determine a position of the aircraft.

3. The landmark information system of claim 1,
wherein the landmark determination device further comprises a data storage unit to provide geographic data.

4. The landmark information system of claim 1,
wherein the landmark determination device further comprises a location determination device to localize the flight position on a geographic map;
wherein the location determination device is coupled to the flight data determination device; and
wherein the location determination device is coupled to the data storage device.

5. The landmark information system of claim 4,
wherein the field of view determination device is coupled to the location determination device.

6. The landmark information system of claim 5,
wherein the landmark determination device further comprises a filter device that carries out a selection of the information to be displayed, relating to the visible landmarks;
wherein the information to be displayed may be specified; and
wherein the filter device is coupled to the field of view determination device.

7. The landmark information system of claim 1,
wherein the translucent display comprises a multitude of light emitting diodes.

8. The landmark information system of claim 1,
wherein the translucent display comprises a multitude of organic light emitting diodes.

9. The landmark information system of claim 8,
wherein a film is glued onto the at least one pane of each of the plurality of aircraft windows, which film in turn is coated with the organic light emitting diodes.

10. The landmark information system of claim 1, further comprising:
a server computer with a storage unit,
wherein the server computer, by accessing applications stored in the storage unit, provides image data to the control unit.

11. The landmark information system of claim 1,
wherein the control unit comprises at least one display controller with a microprocessor, which recalculates the image data that has been provided by the server computer to form a matrix model that is used as a basis for supplying electrical current to the display.

12. The landmark information system of claim 11,
wherein each one of the display controllers is coupled to the server computer by way of a data bus that is equipped to implement real-time data transmission.

13. The landmark information system of claim 1,
wherein each display controller is equipped to request and receive, for the group of aircraft windows, individual application data from the server computer.

14. An aircraft comprising a landmark information system, the landmark information system comprising:
a landmark determination device;
a plurality of aircraft windows each with at least one pane; and
a control unit;
wherein the at least one pane of each of the plurality of windows is coated with a translucent display that is coupled to the control unit which, for the purpose of presenting information, is equipped to supply electrical current in a targeted manner to the display such that at least a partially unimpeded view to the outside continues to be possible through the translucent display even while the information is presented on the display;
wherein the landmark determination device is equipped to provide to the control unit the information that is to be displayed;
wherein the information that is to be displayed involves geographic data relating to landmarks;
wherein the landmarks form part of a field of view of a viewer looking at the landscape through at least one of the plurality of aircraft windows;
wherein the landmark determination device further comprises a field of view determination device to determine landmarks that may be seen through each of the plurality of aircraft windows for an individual visual presentation of the geographic data; and
wherein a particular group of the plurality of aircraft windows is allocated to an individual display controller.

* * * * *